US006487477B1

United States Patent
Woestman et al.

(10) Patent No.: US 6,487,477 B1
(45) Date of Patent: Nov. 26, 2002

(54) STRATEGY TO USE AN ON-BOARD NAVIGATION SYSTEM FOR ELECTRIC AND HYBRID ELECTRIC VEHICLE ENERGY MANAGEMENT

(75) Inventors: Joanne T. Woestman, Dearborn, MI (US); Prabhakar B. Patil, Southfield, MI (US); Ross M. Stunz, Birmingham, MI (US); Thomas E. Pilutti, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/852,075

(22) Filed: May 9, 2001

(51) Int. Cl.$^7$ .............................. B60K 6/04; G01C 21/00
(52) U.S. Cl. ......................... 701/22; 701/209; 701/207; 701/213; 701/123; 340/439; 180/65.4; 180/65.8
(58) Field of Search ........................... 701/22, 209, 207, 701/213, 123; 340/439, 455; 180/65.2, 65.4, 65.8; 318/139, 376

(56) References Cited

U.S. PATENT DOCUMENTS

| 5,343,970 | A | | 9/1994 | Severinsky |
| 5,760,713 | A | | 6/1998 | Yokoyama et al. |
| 5,778,326 | A | | 7/1998 | Moroto et al. |
| 5,832,396 | A | * | 11/1998 | Moroto et al. ............... 701/22 |
| 5,892,346 | A | * | 4/1999 | Moroto et al. ............... 318/587 |
| 5,927,415 | A | | 7/1999 | Ibaraki et al. |
| 5,984,033 | A | * | 11/1999 | Tamagawa et al. ........ 180/65.2 |
| 6,202,024 | B1 | | 3/2001 | Yokoyama et al. |

* cited by examiner

Primary Examiner—William A. Cuchlinski, Jr.
Assistant Examiner—Tuan C To
(74) Attorney, Agent, or Firm—Carlos L.. Hanze

(57) ABSTRACT

The present invention integrates an on-board navigation system to provide energy management for an electric vehicle (EV) and a hybrid electric vehicle (HEV). The HEV control strategy of the present invention accommodates the goals of fuel economy while always meeting driver demand for power and maintaining the functionality of the traction motor battery system using battery parameter controllers. In the preferred embodiment of the present strategy, a vehicle system controller tightly integrates the navigation system information with energy management while en route to a known destination. Present vehicle location is continuously monitored, expectations of driver demand are determined, and vehicle accommodations are made. The system can be configured to includes as part of its present vehicle location data on road patterns, geography with date and time, altitude changes, speed limits, driving patterns of a vehicle driver, and weather. The vehicle accommodations can be configured to use discrete control laws, fuzzy logic, or neural networks.

12 Claims, 4 Drawing Sheets

STRATEGY TO USE AN ON-BOARD NAVIGATION SYSTEM FOR ELECTRIC AND HYBRID ELECTRIC VEHICLE ENERGY MANAGEMENT

BACKGROUND OF THE INVENTION

1. Field of the Invention

The present invention relates generally to electric vehicles (EVs) and hybrid electric vehicles (HEVs), and specifically to using an on-board navigation system for energy management.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the PSHEV presents an opportunity to better control engine idle speed over conventional vehicles by using the generator to control engine speed.

The desirability of electric motor powered vehicles (EVs) and combining an ICE with electric motors (HEVs) is clear. Fuel consumption and emissions can be reduced with no appreciable loss of vehicle performance or drive-ability. The HEV allows the use of smaller engines, regenerative braking, electric boost, and even operating the vehicle with the engine shutdown. Nevertheless, new ways must be developed to optimize EVs and HEVs potential benefits.

One way to optimize electric powered vehicles is efficient energy management. A successful energy management strategy must balance fuel economy, maintain critical vehicle function capacity, (i.e., assuring sufficient stored electrical energy), while always meeting driver demand for power. For example, the control system needs to maintain the battery state-of-charge (SOC) at a level to meet performance requirements while allowing it to accept any upcoming regenerative braking energy. Without knowledge of the possible upcoming power requirements or regenerative braking events, the control system has to conservatively predict and compromise battery SOC.

A possible solution to assist a vehicle system controller (VSC) to predict and adapt to upcoming vehicle power requirements and regenerative braking is the use of a navigational system that uses a global positioning system (GPS) and a digital map database. While this idea is known in the prior art, such systems do not utilize the full potential of navigation system derived information for energy management and efficiency.

U.S. Pat. No. 5,892,346 to Moroto et al. generates an electric power schedule for an EV or an HEV based on a starting point and a destination. A navigation system acts as an arbitrator for feasible routes based on distance traveled en route to the destination compared to the distance capacity of the vehicle. This invention uses the navigation system as a pre-trip planning tool that would, for example, reject the longest proposed routes. See also, U.S. Pat. Nos. 5,832,396 and 5,778,326 to Moroto et al. Similarly, U.S. Pat. No. 5,927,415 to Ibaraki et al., allows the use of a navigation system in advance as a pre-trip planning tool for an HEV to assure power demands are met.

U.S. Pat. No. 6,202,024 to Yokoyama et al. discloses the use of a navigational system on a continuous basis to provide a "best drive route." The invention is not concerned with energy management, nor is it concerned with electric vehicles. For example, it can use a bi-directional navigation system to develop, among other things, a database of road conditions in any given area based on receipt of the same road condition data from a plurality of vehicles in the same area. If several vehicles are reporting use of anti-lock braking systems or air bag deployment, the "best drive route" would be diverted from that area.

A vehicle control system for an EV or HEV that can tightly integrate a navigational system, such as a GPS with a map database, for continuous vehicle energy management is needed.

SUMMARY OF THE INVENTION

Accordingly, the present invention integrates an on-board navigation system to provide energy management for an electric vehicle (EV) and a hybrid electric vehicle (HEV).

The present invention provides a system and method to manage energy in a vehicle with an electric traction motor comprising, a powertrain with at least one motor and an engine, a battery connected to the motor, a vehicle system controller (VSC) connected to the vehicle powertrain, a device connected to the VSC to continuously locate a present vehicle location and infer expectations of driver demand, and a strategy to continuously accommodate fuel economy, driver demand for power and function of the battery.

The system can be configured to include as part of its present vehicle location data on road patterns, geography with date and time, altitude changes, speed limits, identification of intersections with traffic control features such as stop signs and traffic lights, driving patterns of a vehicle driver, and weather.

The strategy can be configured to use discrete control laws, fuzzy logic, or neural networks.

Driver demand or expectation can be based on a driver communicating an intended drive route, or through the use of a search of maps for the locale of the vehicle.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

The present invention relates to electric vehicles (EVs) and hybrid electric vehicles (HEVs). The proposed strategy can be applied to both EVs and HEVs, but for purposes of illustration only, the preferred embodiment is configured for an HEV.

The HEV control strategy of the present invention balances the goals of fuel economy while always meeting driver demand for power and maintaining the functionality of the traction motor battery system. An integrated navigation system (such as a GPS or other device to detect the present location of a vehicle with respect to a map database) can help achieve this goal by providing information about what driver demand to expect. In one embodiment, this information can be provided by the driver communicating an intended drive route to the system or in an alternate embodiment by a predicted path search of maps for the locale of the vehicle. While the strategies are likely to be similar for the two implementations, it may be possible to enact a more aggressive strategy in the case where the route is known.

Figure 1:
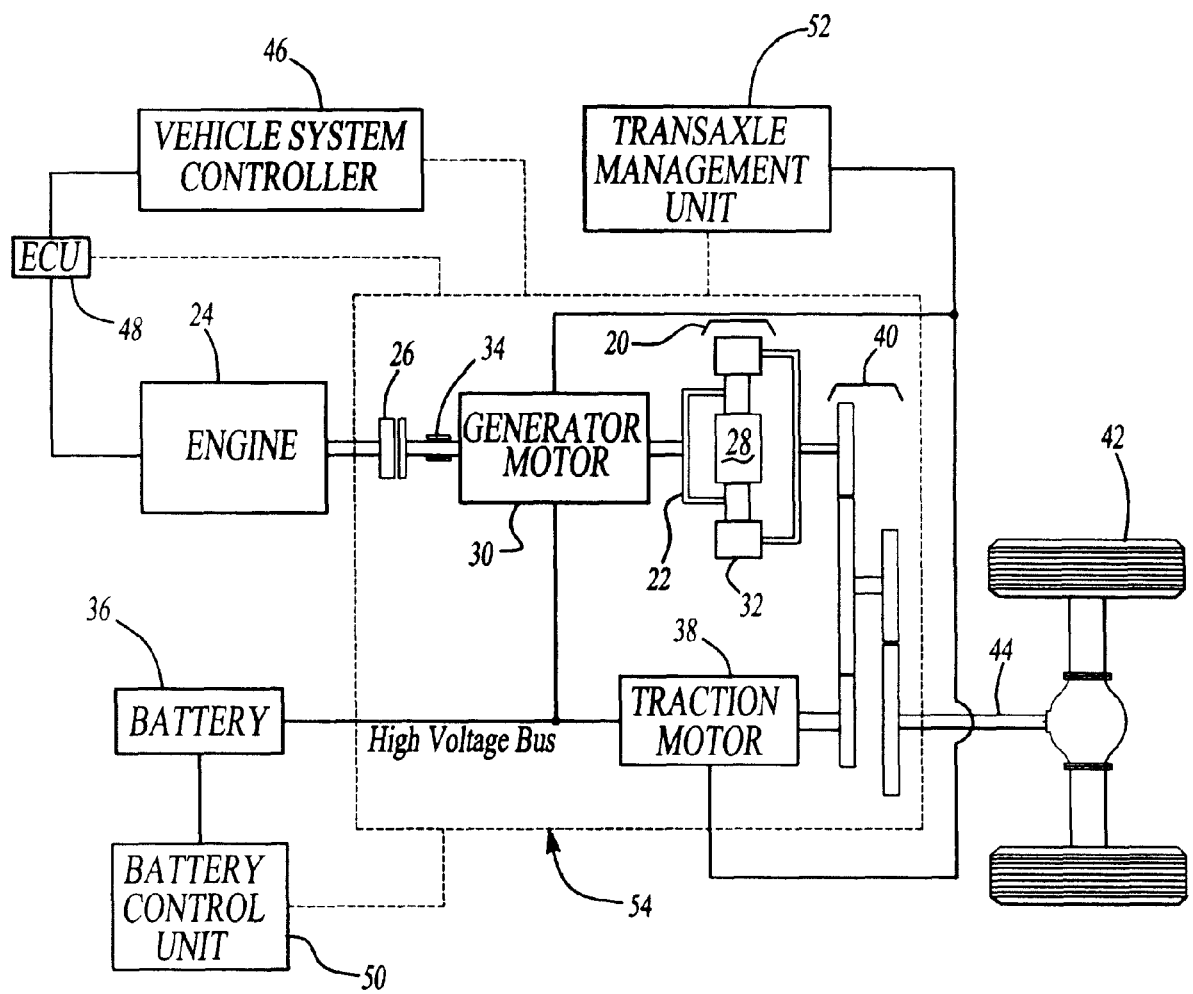
FIG. 1 illustrates a general hybrid electric vehicle (HEV) configuration.

To better understand the present invention, FIG. 1 illustrates a parallel/series hybrid electric vehicle (powersplit) configuration that has an internal combustion engine and at least one motor. In this basic HEV example, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface.

One way to regulate the use of the battery 36 is to control it to a target state-of charge (SOC). The traction motor 38 can be used more intensely to deliver power to the vehicle powertrain when the SOC is above the target and is more aggressively charged either directly from the engine 24 or indirectly from regenerative braking whenever the SOC is below the target.

There are at least two distinct operational strategies that can be applied in HEVs. In either case, the driver demand for power from the system varies with time and the VSC 46 needs a strategy to determine how to deliver this power. In a "load-leveling" strategy, the engine 24 power is held relatively constant and the traction motor 38 power is varied to ensure that the sum of the powers equals driver demanded power. This allows the engine 24 to operate at an efficient operating point leading to high fuel economy. In addition, it provides responsive driving feel since the electric drive system can respond quite quickly. In a "load-following" strategy, engine 24 power changes more quickly to nearly follow the driver demanded power and the traction motor 38 is used only when the engine 24 is off or when the engine 24 power can not be changed fast enough to meet driver demand. This reduces the battery 36 power throughput thereby reducing wear. This extends battery 36 while still providing responsive driving feel.

The VSC 46 can include battery 36 conditioning strategies to maintain battery 36 functionality while extending useful life. Some possible battery 36 conditioning strategies used by various battery parameter controllers (not shown) include the following: charging the battery to a high state of charge to balance the charge across multiple cells; discharging or charging the battery to a very low or very high state of charge to calibrate the state of charge estimation routine; changing the charging/discharging pattern of the battery by, for example, moving the target SOC, to erase any memory effects; removing all loads from the battery to allow re-zeroing of the battery system current sensor; or cooling the battery with a cooling system (not shown) such as a radiator or air-conditioner.

In general, the present invention is the combination of the VSC 46 with information from a navigational system such as a global positioning system (GPS) with a digital map database. A GPS/Map integrated VSC 46 can adapt to local geography, possibly including (but not limited to) grade, terrain, traffic and road pattern which can add far more precision to this balance.

To balance the goals of achieving high fuel economy and delivering required performance, the strategy of the present invention may use the traction motor 38 whenever it is more efficient or whenever the engine 24 cannot meet driver demand alone. At the same time the strategy needs to manage the battery 36 state of charge (SOC) so that SOC never goes too low to meet any upcoming performance requirement while never getting too high to accept any upcoming regenerative braking energy. If navigation-based information is integrated into the VSC 46 strategy decisions, less conservative strategy decisions are possible while still ensuring upcoming demands can be met.

By way of general examples of meeting performance demands, if the VSC 46 knows, from incoming navigation system position data, there are no significant changes in grade in the vicinity of the vehicle, it can use more of the battery 36 SOC range to meet its efficiency goals with confidence that it will meet all its near term grade performance goals. Conversely, if the navigation system derived data indicates mountainous terrain in the direction of the vehicle, the VSC 46 can protect for likely upcoming grade performance needs with strategy modifications. Also, if the navigation system indicates the vehicle is likely to be entering a highway, it can choose to turn on the engine 24 to prepare for an expected demand for a sudden increase in acceleration as the vehicle merges into the highway. And finally, if the VSC 46 integrated with navigation system derived information indicates frequent intersections with traffic lights, or heavy traffic in the vicinity, the strategy can assume that a slow, stop and go driving pattern is likely in the near future and can alter its operating strategy accordingly.

The second general goal of the strategy of the present invention is maintenance of the battery 36 state of charge (SOC). Generally, the VSC 46 maintains battery 36 SOC from current operating conditions, such as accelerator position and other associated vehicle loads such as the air conditioner. These monitored conditions reflect the current and past operating regime, and are used to predict the future energy needs. When past conditions match the future conditions, energy management based on past data can be accomplished acceptably. However, when the future conditions vary significantly from the past, energy management assumptions based on past data can lead to compromised vehicle performance.

For example, a route guidance system such as the global positioning system with an integrated map navigation system integrated within the VSC 46 can reduce compromised battery 36 SOC conditions by adding knowledge of upcoming vehicle elevation gradients. In urban driving, the amount of starts and stops through intersections could be anticipated. Additionally, with real-time traffic information, traffic density can also be considered in energy management.

In the preferred embodiment of the present strategy, the VSC 46 tightly integrates the navigation system information with energy management while en route to a known destination (i.e., not as merely a pre-trip prior art planing tool). The approach takes the next logical step, and uses road network information from the map database to influence charge/recharge strategies. One approach is to take the navigation route and plan charge/recharge cycles based on elevation gradient, or other factors that can be extracted from the map database that would be of use to the energy management controller. In this way, the energy management controller can schedule appropriate power level cycling.

An alternative embodiment provides a route preview of a specified distance or time, which would enable the energy management controller to effect accessory load decisions based on, for example, downhill (or uphill) grade expected ahead as well as traffic conditions. Real-time use of navigation system derived information will allow more efficient use of energy for accessory loads and regenerative braking while driving.

GPS/Map data make the comprehensive energy management approach of the present invention possible. The following table shows some examples of the information available from a GPS navigation system and the driver demand expectations that the VSC 46 could infer from it.

| Navigation System Information | Inferred Expectations of Driver Demand |
| --- | --- |
| Altitude change | Grade expectations |
| Road pattern (interstate highway, rural, city) or speed limit | Speed expectations |
| Road pattern (interstate, highway, rural, city) or stop light/sign locations | Braking expectations |
| Driver driving patterns | Braking and speed expectations |
| Intersection density and traffic control information | Braking and speed expectations |
| Weather | Speed expectations |
| Geography and time/date | Temperature expectations |

Figure 2:
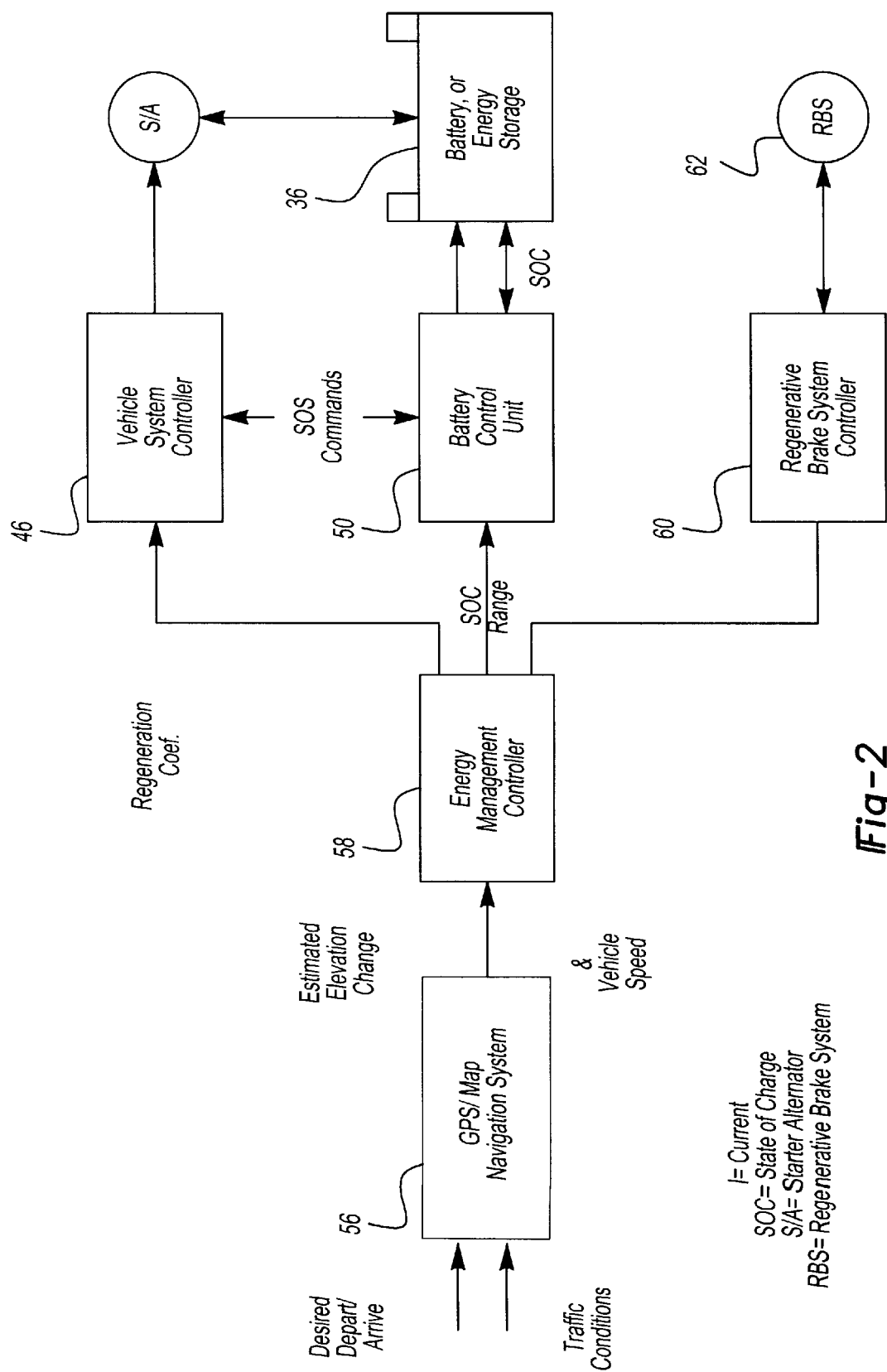
FIG. 2 illustrates the overall vehicle system control energy management strategy of the present invention with integrated navigation system.

FIG. 2 illustrates the overall VSC 46 energy management strategy of the present invention with integrated navigation system. A GPS and map navigation system 56 can be used by the VSC 46 to manage the battery 36 and regenerative braking systems 62 so that vehicle fuel economy and range are increased.

The GPS and map navigation system 56 has as inputs desired departure, arrival times and locations. It can also receive traffic updates, road conditions and terrain information. The GPS and map navigation system 56 can estimate the number of vehicle starts/stops, and accelerations/ decelerations from these input data. That data with the estimated vehicle speed from a vehicle speed sensor (not shown) can input to an energy management controller 58. The energy management controller 58 is a functional part of the VSC 46, but is shown separate in the figure to aid in understanding the invention.

The energy management controller 58 can determine any output parameters to adjust the output of the regenerative braking process to best match the upcoming driving cycle to a regenerative brake system controller 60, which interacts with the regenerative braking system (RBS) 62. The energy management controller 58 can also output to the VSC 46 and BCU 50 the ideal SOC target range.

For example purposes only, an anticipated route with high speeds and long ascents and descents would need an aggressive regenerative strategy, and as much headroom in the battery 36 to store energy as possible. Alternately, a route at a nearly constant speed over flat terrain would require a SOC as high as possible to facilitate passing assist boost with little opportunity to regenerate energy.

Chassis dynamometer tests over urban cycles (Federal Urban Driving Schedule) and high-speed (Highway Driving Schedule) cycles have confirmed the benefits of energy management to match the driving cycle. In less interactive battery systems (and thus more conservative), controllers try to match a fixed SOC target band (e.g., between 40 percent and 70 percent) to be sure the battery always has some room to collect regenerated energy while never too low to start the vehicle.

The present invention allows multiple SOC target ranges. For example, the hilly high-speed cycle might be best matched with a 40 percent to 60 percent target window. Whereas the high speed, flat terrain cycle might be best matched by a 60% to 80% target window.

The present invention can be implemented utilizing classic, discrete control laws, fuzzy logic, or neural networks. Fuzzy logic control is an approach that incorporates a rule-based strategy in the control hierarchy. Neural network control uses a network of cells that are trained with prior examples to model future outputs based on learned training data.

Figure 3:
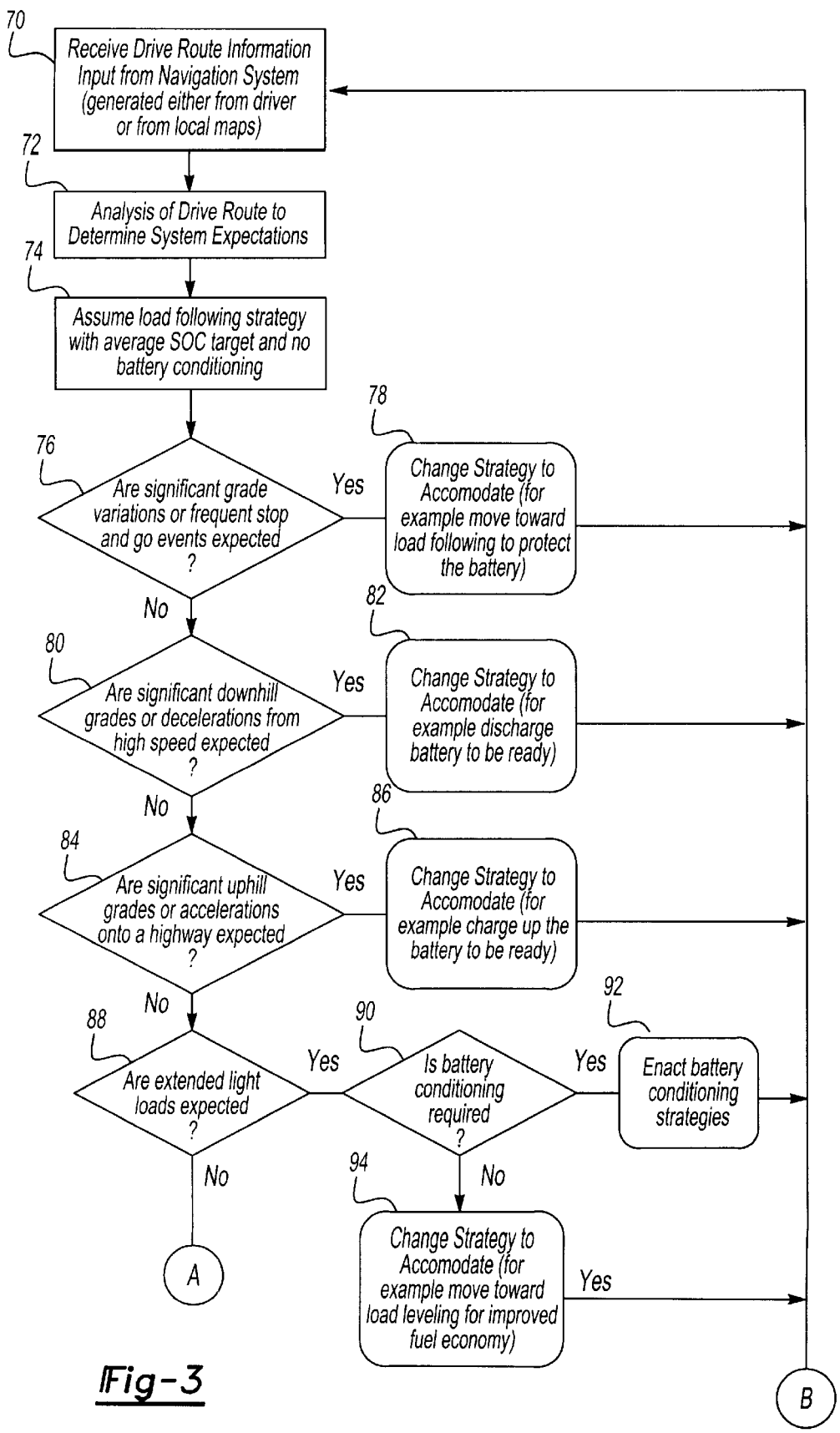
FIG. 3 illustrates the logic flow of the energy management control strategy of the present invention.
Figure 3A:
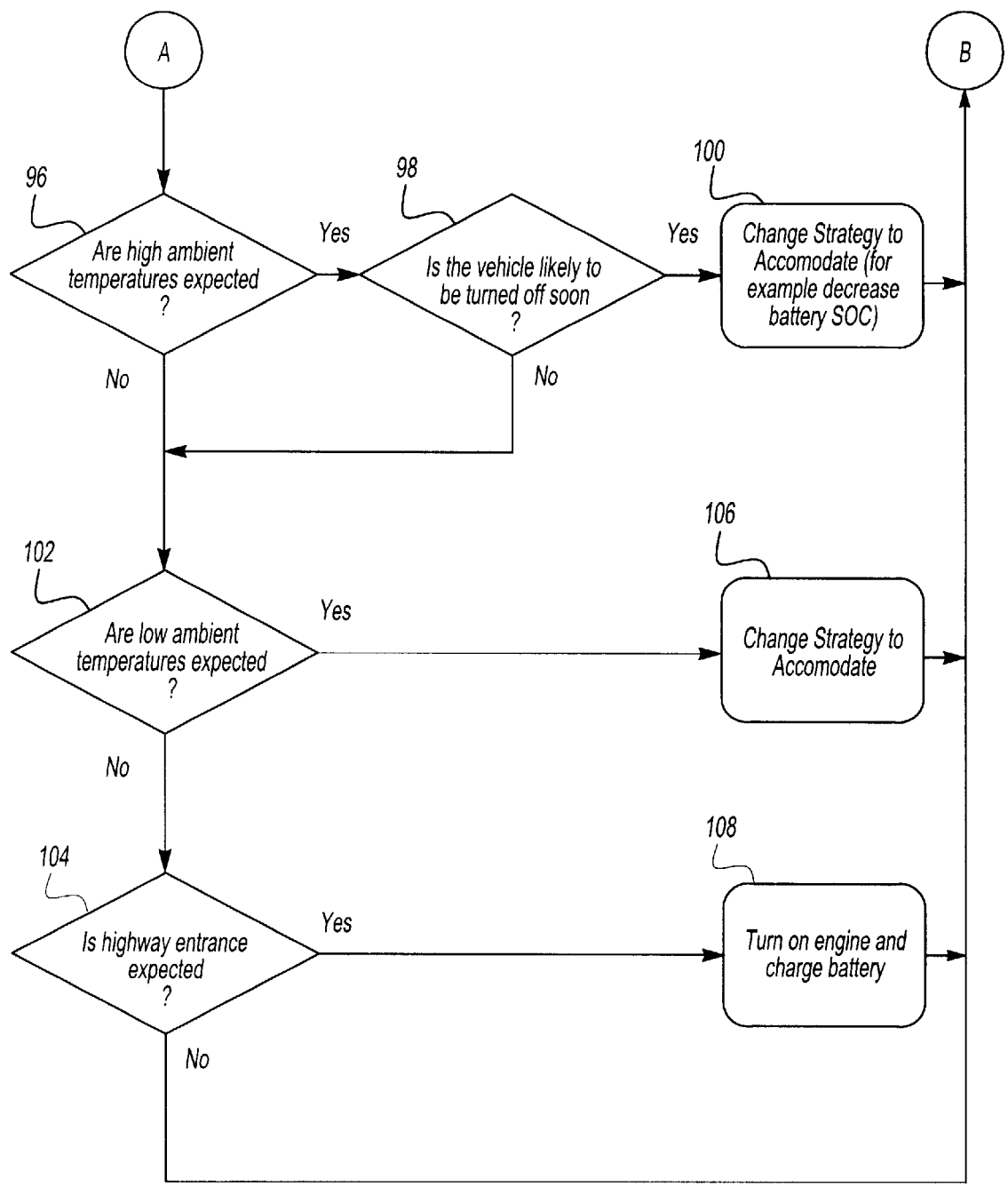

FIG. 3 illustrates the logic flow of the energy management control strategy of the present invention using classic discrete logic controls. The energy management controller 58 within the VSC 46 can take actions based on the inferred expectations of driver demand outlined in the table above to ensure that the system can optimize its fuel economy, protect its traction battery functionality and meet the driver demand. To better understand the logic decisions illustrated in FIG. 3, the following assumptions within the strategy are provided as follows:

If a steep uphill grade is expected, the VSC can control the battery SOC to a high value so that when the driver power demand increases to cause the vehicle to climb the hill, there exists sufficient battery power to provide electric assist and to allow the engine to remain on its optimal efficiency curve.

If a steep downhill grade is expected, the strategy can control battery SOC to a low value so that when the driver demand for negative (braking) power occurs to cause the vehicle to descend the grade in a controlled manner, the strategy is able to maximize the amount of regenerative braking energy that it is able to capture.

If extended city road patterns are expected, the strategy can expect a significant amount of stop and go driving that would cause significant battery power throughput and it can choose to operate in a more load following manner to protect the functionality of the battery.

Similarly, if extended hilly road patterns are expected with frequent uphill and downhill grades that would cause significant battery power throughput, the strategy can choose to operate in a more load following manner to protect the functionality of the battery.

If extended light load conditions are expected, as inferred by moderately high speed on flat highway surfaces, the control strategy can choose to enact some battery conditioning strategies during this time, confident that the demand on the electric strategy is unlikely to change during the strategy enactment.

Similarly, if extended light load conditions are expected, as inferred by moderately high speed on flat highway surfaces, the control strategy can choose to operate in a load leveling strategy, providing quick response without severe wear on the traction battery.

If extended high temperature is expected (particularly if it knows that the vehicle is likely to be turned off in the near future, as inferred, for example by the imminent completion of the specified trip), the strategy may choose to operate at a lower target SOC to reduce self-discharging when the vehicle is turned off and left sitting.

Similarly, if extended low temperature is expected, SOC (particularly if it knows that the vehicle is likely to be turned off in the near future, as inferred, for example by the imminent completion of the specified trip), the strategy may choose to operate at a higher target SOC to ensure that sufficient energy will be available to restart the vehicle after the vehicle is turned off and left sitting (this is particularly important if the traction battery also serves as the source of engine starting power).

If entrance to a highway is expected, the strategy may choose to prepare for an increase in driver demanded power either by turning the IC engine on if it is not already or by charging up the battery if the engine is already on.

Turning back to logic flow diagram in FIG. 3, at Step 70, the strategy receives drive route information input from the navigation system (generated from either the driver or local maps). The strategy commands an analysis of the drive route to determine system expectations at Step 72 and assumes a load following strategy with average SOC target and no battery conditioning at Step 74.

Next, at Step 76, the strategy determines if significant grade variations or frequent stop and go events are expected. If yes, the strategy accommodates this expectation at Step 78 by, for example, moving toward a load following to protect the battery, then returning to Step 70. If no, the strategy determines if significant downhill grades or decelerations from high speed are expected at Step 80. If yes, the strategy changes to accommodate this expectation by, for example, discharging the battery at Step 82, then returning to Step 70. If no, the strategy determines if significant uphill grades or accelerations onto a highway are expected at Step 84. If yes, the strategy changes to accommodate this expectation by, for example, charging the battery at Step 86, then returning to step 70. If no, the strategy next determines whether extended light loads are expected at Step 88. If yes, the strategy must make an additional determination of whether battery conditioning is required at Step 90. If yes, the strategy enacts battery-conditioning strategies at Step 92, then returns to Step 70. If battery conditioning is not required Step 90, the strategy changes to accommodate this expectation by, for example, moving toward load leveling for proved fuel economy at Step 94, then returning to step 70.

If extended light loads are not expected at Step 88, the strategy determines at Step 96 whether high ambient temperatures are expected. If yes, the strategy further determines at Step 98 whether the vehicle is likely to be turned off soon. If yes at Step 98, the strategy changes to accommodate this expectation by, for example, decreasing battery SOC at Step 100, then returning to Step 70. If Step 96 or Step 98 are no, the strategy at Step 102 determines whether low ambient temperatures are expected. If yes at Step 102, again the strategy changes to accommodate this expectation at Step 106, then returning to Step 70. If the determination at Step 102 is no, the strategy next makes a determination of whether an increase in vehicle speed is anticipated such as whether entrance to a highway is expected at Step 104. If yes, the strategy can turn on the engine and charge the battery at Step 108, then return to Step 70. Otherwise, the strategy simply returns to Step 70.

The above-described embodiment(s) of the invention is/are provided purely for purposes of example. Many other variations, modifications, and applications of the invention may be made.

We claim:

1. A system to manage energy in a vehicle having a powertrain that includes an electric motor, a battery connected to said electric motor and an engine, comprising;

a vehicle system controller (VSC) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy; and wherein said present vehicle location comprises data on weather.

2. A system to manage energy in a vehicle having a powertrain that includes an electric motor, a battery connected to said electric motor and an engine, comprising:

a vehicle system controller (VSC) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy; and wherein said strategy uses discrete control laws.

3. A system to manage energy in a vehicle having a powertrain that includes an electric motor, a battery connected to said electric motor and an engine, comprising:

a vehicle system controller (VSC) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy; and wherein said strategy uses fuzzy logic.

4. A system to manage energy in a vehicle having a powertrain that includes an electric motor, a battery connected to said electric motor and an engine, comprising:

a vehicle system controller (Vsc) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy; and wherein said strategy uses neural networks.

5. A system to manage energy in a vehicle having a powertrain that includes an electric motor, a battery connected to said electric motor and an engine, comprising:

a vehicle system controller (VSC) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy;

wherein said strategy accommodates functionality of said battery with battery parameter controllers; and wherein said battery parameter controllers control battery temperature.

6. A system to manage energy in a vehicle having a powertrain that includes an electric motor, a battery connected to said electric motor and an engine, comprising:

a vehicle system controller (VSC) connected to said vehicle powertrain;

a device connected to and providing data to said VSC to continuously locate a present vehicle location and infer expectations of driver demand for power causing said vehicle to operate pursuant to a strategy embodied in said VSC to continuously accommodate fuel economy, said driver demand for power and functionality of said battery rather than in a manner that would be dictated by said VSC in the absence of said strategy;

wherein said strategy accommodates functionality of said battery with battery parameter controllers; and wherein said battery parameter controllers remove all loads from said battery.

7. A method of managing energy in a vehicle having a powertrain that includes an electric motor, a battery connected to said electric motor, an engine, and a vehicle system controller (VCS) connected to said powertrain for controlling operation of said powertrain, comprising the steps of:

locating continuously a present vehicle location; inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy; and wherein said present vehicle location comprises data on weather.

8. A method of managing energy in a vehicle having a powertrain that includes an electric motor, a battery connected to said electric motor, an engine, and a vehicle system controller (VCS) connected to said powertrain for controlling operation of said powertrain, comprising the steps of:

locating continuously a present vehicle location; inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy; and wherein said strategy uses discrete control laws.

9. A method of managing energy in a vehicle having a powertrain that includes an electric motor, a battery connected to said electric motor, an engine, and a vehicle system controller (VCS) connected to said powertrain for controlling operation of said powertrain, comprising the steps of:

provided locating continuously a present vehicle location;

inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy; and wherein said strategy uses fuzzy logic.

10. A method of managing energy in a vehicle having a powertrain that includes an electric motor, a battery connected to said electric motor, an engine, and a vehicle system controller (VCS) connected to said powertrain for controlling operation of said powertrain, comprising the steps of:

locating continuously a present vehicle location; inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy; and wherein said strategy uses neural networks.

11. A method of managing energy in a vehicle having a powertrain that includes an electric motor, a battery connected to said electric motor, an engine, and a vehicle system controller (VCS) connected to said powertrain for controlling operation of said powertrain, comprising the steps of:

locating continuously a present vehicle location; inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy;

wherein accommodating continuously said functionality of said battery comprises controlling battery parameters; and wherein controlling said battery parameters comprises controlling battery temperature.

12. A method of managing energy in a vehicle having a powertrain that includes an electric motor, a battery connected to said electric motor, an engine, and a vehicle system controller (VCS) connected to said powertrain for controlling operation of said powertrain, comprising the steps of:

locating continuously a present vehicle location;

inferring expectations of driver demand for power based on said present vehicle location;

accommodating continuously fuel economy, said driver demand for power and functionality of said battery;

operating said vehicle pursuant to a strategy embodied in said VSC, rather than in a different manner that would be dictated by said VSC in the absence of said strategy;

wherein accommodating continuously said functionality of said battery comprises controlling battery parameters; and wherein controlling said battery parameters comprises removing all loads from said battery.

* * * * *